United States Patent [19]

Kilcher et al.

[11] Patent Number: 4,667,078
[45] Date of Patent: May 19, 1987

[54] APPARATUS FOR GUIDING A WIRE OR STRIP-LIKE CUTTING ELECTRODE ON A MACHINE TOOL

[75] Inventors: Beat Kilcher, Arcegno; Gideon Levy, Orselina, both of Switzerland

[73] Assignee: Ag fur industrielle Elektronik Agie Losone b. Lacarno, Losone, Switzerland

[21] Appl. No.: 734,412

[22] Filed: May 14, 1985

[30] Foreign Application Priority Data

May 15, 1984 [CH] Switzerland ..................... 2393/84

[51] Int. Cl.$^4$ ............................................. B23H 7/10
[52] U.S. Cl. ................................. 219/69 W; 204/206
[58] Field of Search .............. 219/69 W, 69 M, 69 V, 219/69 R; 204/206, 224 M

[56] References Cited

U.S. PATENT DOCUMENTS

| 3,822,374 | 7/1974 | Ullmann et al. | 219/69 W |
|---|---|---|---|
| 4,242,556 | 12/1980 | Ullmann et al. | 219/69 M |
| 4,298,781 | 11/1981 | Inoue | 219/69 W |
| 4,383,161 | 5/1983 | Corcelle | 219/69 W |
| 4,420,671 | 12/1983 | Bonga | 219/69 W |
| 4,495,393 | 1/1985 | Janicke | 219/69 W |

FOREIGN PATENT DOCUMENTS

| 56-39831 | 4/1981 | Japan | 219/69 W |
|---|---|---|---|
| 139830 | 10/1981 | Japan | 219/69 W |
| 178619 | 11/1982 | Japan | 219/69 W |
| 58-34722 | 3/1983 | Japan | 219/69 V |
| 59-14428 | 1/1984 | Japan | 219/69 W |
| 152022 | 8/1984 | Japan | 219/69 M |
| 526365 | 2/1971 | Switzerland . | |

Primary Examiner—A. D. Pellinen
Assistant Examiner—Geoffrey S. Evans
Attorney, Agent, or Firm—Neuman, Williams, Anderson & Olson

[57] ABSTRACT

Axial tension on the wire or strip like electrode is achieved by having the electrode looped around a grooved wheel controlled by a hysteresis motor near an upper or lower guide head while the wire drive is located near the other guide head so that in the working zone the electrode is subject to the action of tensile stress necessary for electroerosion and the remaining electrode guide area is kept free from increased tensile stress on the electrode. Additionally an angle coder is used with the hysteresis motor to measure both the rotational speed and the position of the grooved wheel.

11 Claims, 6 Drawing Figures

APPARATUS FOR GUIDING A WIRE OR STRIP-LIKE CUTTING ELECTRODE ON A MACHINE TOOL

BACKGROUND OF THE INVENTION

The invention relates to an apparatus for guiding a wire or strip-like cutting electrode on a machine tool and, particularly an apparatus for controlling the axial tension of a wire or strip-like tool electrode in the working zone.

In conventional spark-erosive or electrochemical cutting installations, a desired contour is cut in a workpiece with the aid of wire or strip electrodes. The wire or strip electrode generally comprises a wire with a diameter between 0.01 and 1.00 mm or, in special cases, strips of a corresponding cross-section. Spark-erosive machining, as a result of an electronic process control, permits a very high machining accuracy, which is typically approximately 0.001 mm. Thus, very high precision demands are made on the guidance and driving means for the wire electrode.

An important part in the maintaining of the desired machining precision is played in such installations by devices for driving and guiding the cutting wire. For example, wire guide means for spark-erosive or electroerosive cutting are known from West German Pat. No. 26 25 349. A loop of the of the cutting wire is completely disengaged from the supply and take-up side of the machine and is driven in the working zone by means of fixed speed driven roller pairs. The wire in the working loop is them tensioned by special means, e.g. weights or springs, and is guided in very precise guide rollers. These means have proved satisfactory in practice.

With the increased use of spark-erosive cutting in conjunction with special electronic controls which control the relative position between two wire guide heads bounding the working zone, as described in West German Pat. No. 20 52 261, it has also known in the case of large wire slope angles to correspondingly orient the wire guide heads, as is known from Patent Application No. WO 80-02395.

If the guide heads are relatively strongly pivoted or oriented in operation on spark-erosive cutting equipment equipped with the described wire drive, the wire drive housed in the yoke of the equipment must exert very high forces on the guide heads, due to the relatively high wire tension, e.g. 500 to 2500 g, in the working loop of the wire electrode. The mounting supports and drive means, as well as the brackets for the oriented wire guide heads, can therefore be appreciably deformed and deflected. This is particularly the case when it is necessary to work with a relatively large wire angle, that is, with a strong lateral relative displacement of one of the guide heads with respect to the other. As the wire guide heads are directly responsible for determining the geometry of the workpieces and the cutting precision, such deformations are undesirable for very precise machining tasks. Further, the placement of the complete wire drive and guide means directly on the oriented guide heads is not technically advantageous due to the bulk of the construction.

SUMMARY OF THE INVENTION

The problem addressed by the present invention is to so select the manner of guiding the wire electrode in the working loop that the deformations on the oriented guide heads or their brackets are kept as small as possible.

According to the invention, a wire or strip-like cutting electrode is guided through a working zone by two wire guides, positioned on both sides of the working zone and a means associated with the wire guides provides the necessary tensile stress on the cutting electrode in the working zone. The tensioning means preferably includes a pair of driven clamping rollers positioned at the outlet side of the wire guide on the take-up side of the working zone and a counter-holder means positioned at the inlet side of the working zone, where the counter-holder means can be a grooved wheel having a predetermined torque action, around which wheel the cutting electrode is wound in transport engagement. The tensioning means can be fixed to the wire guides, or in the case where one or both of the wire guide assemblies are pivotable to be oriented in line with the direction of the cutting electrode during taper cutting, the clamping rollers and/or the counter-holder means can be in close proximity to its associated wire guide but not fixed to the wire guide, the electrode being guided between the wire guide and the fixed tensioning means member by a telescopic support that is adapted to adjust to an oriented position of the wire guide.

As a result of these measures, the essential elements of the wire drive can still be arranged, as before, on the machine yoke but are subject to a lower wire tensile stress. Nevertheless, the reliable deflection and guidance of the wire in all the deflection zones up to the working zone is ensured. Placing the tensioning means directly on the guide heads ensures that in the actual cutting zone, the external tension exerted onn the wire electrode for the necessary tensile stress acts exclusively in the direction of the wire axis, when cutting with either a cylindrical and conical geometry.

The advantages achieved with the present invention are in particular based on the possibility of achieving virtually unlimited sloping positions of the wire. As a result, the field of use for such machine tools can be considerably extended, although the present invention is also an important improvement in conventional uses. In the common case of machining conical prismatic openings in a corner, two sloping planes abut and produce a much higher slope angle at this piont (ship's bow effect), which very rapidly increases the acute-angled nature of the corner between the lateral faces. In the case of the invention, the optimum working precision of the machining installation is substantially no longer influenced by the wire guidance means, while reliable, accurate operation of the wire drive is still ensured, even in the case of larger wire angles of, for example, more than 10°.

BRIEF DESCRIPTION OF THE DRAWINGS

The invention is described in greater detail hereinafter relative to illustrative embodiments and the attached drawings, which show.

DETAILED DESCRIPTION OF THE PREFERRED EMBODIMENTS

Figure 1:
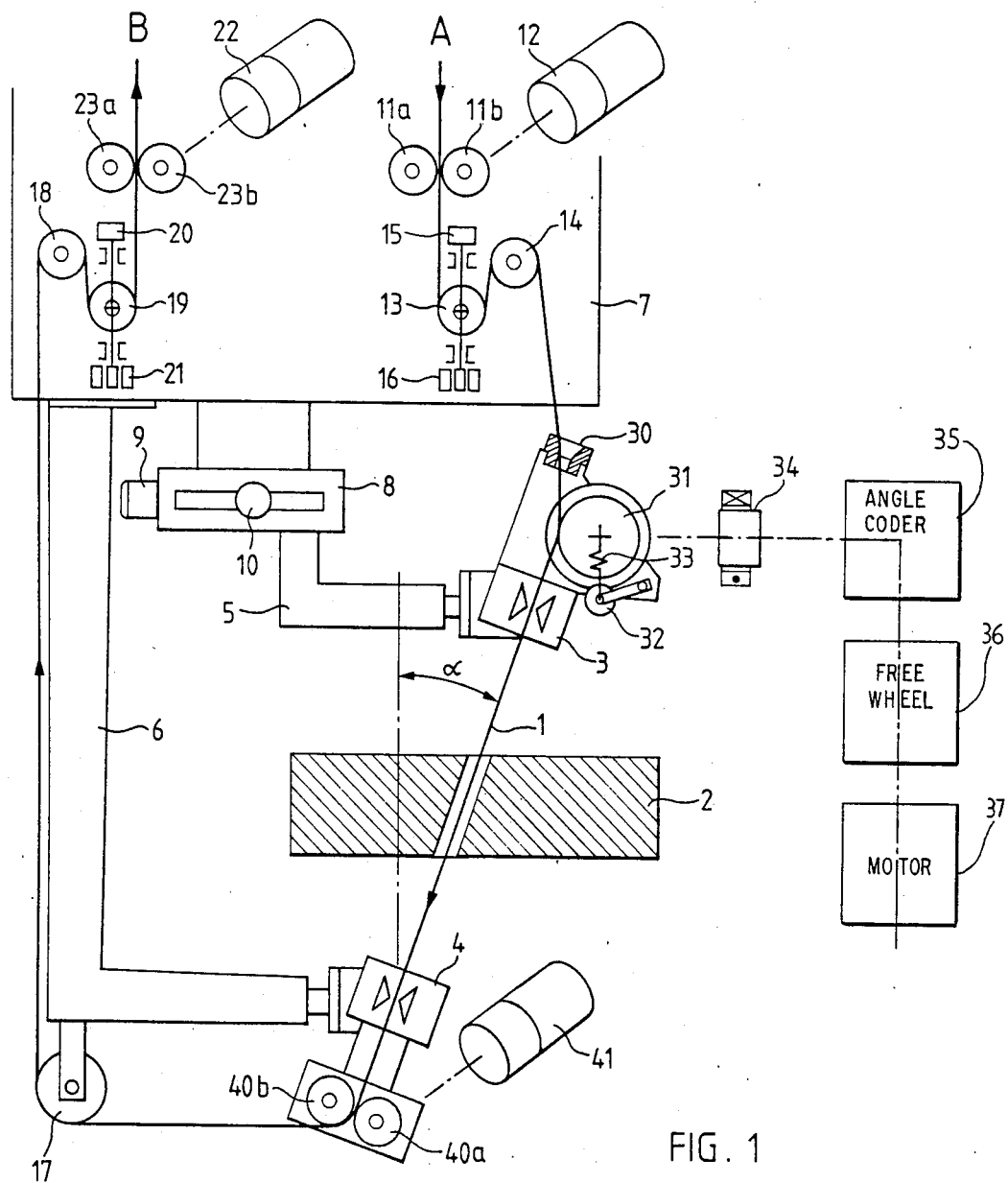
FIG. 1 the diagrammatic construction of a wire drive of a spark-erosive cutting installation, with oriented guide heads and with a device for increasing the wire tensile stress in the working zone in accordance with the invention.

FIG. 1 diagrammatically shows in cutaway form the working zone of a spark-erosive cutting installation with a wire electrode 1 and a workpiece 2. Guide heads 3, 4 maintain the wire electrode 1 in the intended position with respect to workpiece 2, for example in accordance with the aformentioned application No. WO 80-02395, and are correspondingly oriented at a slope angle α for the sloping position of electrode 1. Guide heads 3, 4 are rotatably attached to supporting arms 5, 6, which are connected to a machine frame 7, only partly shown in FIG. 1. The upper arm 5 is attached by means of a coordinate slide 8 the machine frame 7. Coordinate slide 8 is provided with servomotors 9, 10. The relative position of the upper guide head 3 with repect to the lower guide 4 can be set in a controlled manner by motors 9, 10 of the cartesian coordinate slide 8. This makes it possible to set a desired angle α for the cutting contour.

During spark-erosive working, wire electrode 1 is passed by drive means (not shown) of the machine tool through the workpiece 2 fixed to the machine table. Clamping means for workpiece 2 have been ommitted from the drawing for clarity.

In the preferred embodiment, wire electrode 1 is supplied from a supply side A by way of a first pair of clamping rollers 11a, 11b driven at a constant speed by a geared motor 12. The wire can be stored on reels or bobbins on supply side A. Any disturbing removal forces emanating from the storage means are not passed on to the wire working area, owing to the fixed speed drive of the pair of clamping rollers 11a, 11b. The wire is then guided around a compensating roller 13 and a guide pulley 14. Compensating roller 13 may be loaded with a variable weight 15. The latter can be replaced by spring elements or hydraulic force elements, which act on the roller 13. Thus, the wire electrode 1 is subject to the action of a lower tension of the order of a few hundred grams so that it is reliably fed to the upper guide head 3 under all cutting conditions, particularly in consideration of all the wire displacements which occur during conical cutting. A position sensor 16 for the compensating roller 13 controls the drive speed of the geared motor 12 in such a way that the wire is always supplied to the working zone from supply side A at the speed at which the wire is taken up in the working zone.

After the passage of the cutting wire electrode 1 under increased tension through the working zone, which will be described in greater detail, the wire is once again led under a limited tension of say a few hundred grams, from the working zone to the take-up side B. This is carried out by a second compensating roller 19, which is subject to the action of a second variable weight 20, apart from further guide pulleys 17, 18. A second position sensor 21 controls the speed of a second geared motor 22, so that by means of a second pair of clamping rollers 23a, 23b, the wire is supplied to the take-up side B. Any jerking or pulling forces of slicing means, wire benders or winding spools on take-up side B are isolated from the working loop by the fixed speed drive of the second pair of clamping rollers 23a, 23b.

The supply of the wire electrode, which is slightly tensioned, by the supply side A to the upper feed head 3 initially takes place through a wire guide element 30, which may be a ring, which is preferably made from a low-friction, wear-proof material, such as sapphire with a very fine surface. This ensures that the wire is subject to virtually no wear and that no additional frictional forces occur at this deflection point. Beyond the wire guide element 30, the wire loops around a V-grooved wheel 31, from which the wire is subsequently guided into the upper guide head 3 and to the working zone with no wire overlap in the wheel 31. As close as possible to the discharge point of the wire from the grooved wheel 31, there is provided a clamping wheel 32 which is drawn by a tension spring 33 against the spindle of the grooved wheel 31 and which fixes the wire electrode 1 to the wheel 31.

Figure 2:
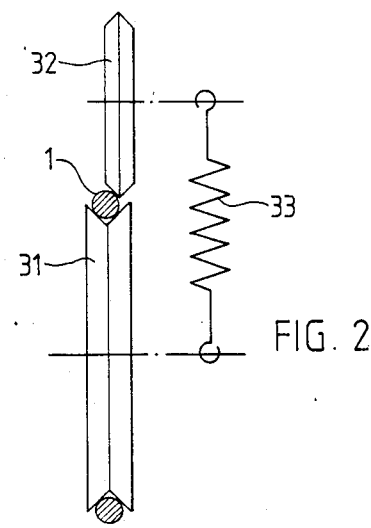
FIG. 2 details of the clamping wheel arrangement of the wire drive shown in FIG. 1.

FIG. 2 shows the clamping mechanism from the side. While the grooved wheel 31 receives the wire electrode 1 in its depression, clamping wheel 32 has a V-shaped ridge that runs in slightly displaced manner with one edge or side against wire electrode 1, securing the latter against a side of wheel 31. The clamping force is defined by tension spring 33.

The grooved wheel 31 is fixed to a rotatable spindle, on which further devices are mounted. The first of these is a hystersis motor 34, to whose rotor is fitted in contact-free manner a wire tension spring counter to the wire running direction. This setting force acts through the V-shaped wheel 31, in balance with the uniform low force of the supply side, to set the wire tensile stress in the working zone, which may be in the range between 500 and 2500 g. Alongside the hysteresis motor 34, on the rotary spindle of the grooved wheel 31 is provided an angle coder 35, by which it is possible to measure both the rotational speed and the position of the wheel 31. The spindle then passes into a freewheel 36, which may be constructed as a mechanical ball freewheel to lock the rotation of the grooved wheel 31 in the rearward direction so that the wheel can only rotate in the wire running direction when the other side of the freewheel is secured. Freewheel 36 is followed by an electric motor 37, which can drive the secondary side of the freewheel in both directions. This motor 37 makes it possible to drive the grooved wheel 31 in the wire running direction in order to advance wire electrode 1, for example when the wire is threaded. Motor 37 can also be driven backwards, so that the freewheel 36 is released and the wheel 31 can be rotated backwards by the limited load applied to the supply side by weight 15 of compensating roller 13. This makes it possible to pull back a wire residue at the end of a work cycle in preparation for the next starting position.

On the wire outlet side of the lower guide head 4 is provided a third pair of clamping rollers 40a, 40b, which are driven at an approximate fixed speed in accordance with the process by a third geared motor 41. This third clamping roller pair 40a, 40b supplies an opposing force to the increased wire tension imposed on the grooved wheel 31 and continuously pulls the wire electrode 1 through the working zone at the fixed speed, independently of whether the conditions influencing the wire tension on the wire guides or in the working zone are modified be wear, contact or varying friction. As a result of the fixed speed drive, the described limited removal forces on the take-up side B have no influence on the wire tension within the working zone. The wire speed in the take-up side B is automatically adjusted to the wire discharge speed of the third pair of clamping rollers 40a, 40b through the second compensating roller 19 and the second position sensor 21 connected thereto which controls the speed of the second geared motor 22.

Figure 3:
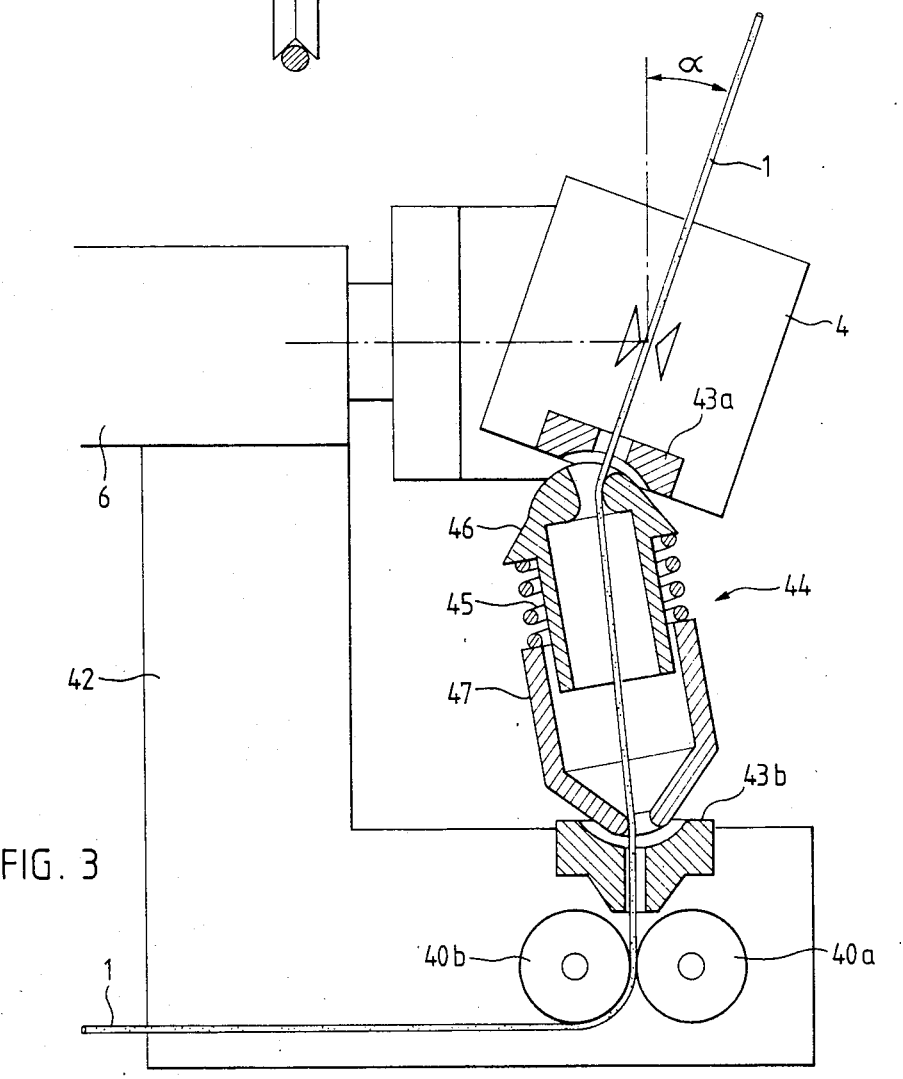
FIG. 3 another embodiment for a wire guide member.

A simplified embodiment will be described in connection with FIG. 3. If the lower supporting arm 6 carrying the lower guide head 4 is fixed directly to machine frame 7, it does not perform adjustment movements for producing the slope angle as does the upper guide head 3 of supporting arm 5 with the aid of a coordinate slide 8. The clamping roller pair 40a, 40b according to FIG. 1 is not in this case fixed directly to the guide head 4, but is instead fixed in the immediate vicinity thereof by a holder 42, which is rigidly attached to the supporting arm 6. The third geared motor 41 is also fixed to holder 42. Provided in holder 42 and on the outlet side of the lower guide head 4 are centrally drilled joint seats 43a, 43b, between which is arranged a telescopic support 44. The latter has a central bore, through which the wire electrode 1 is passed from the outlet of the guide head 4, through the center of joint seat 43a, to the central bore within joint seat 43b, and from there to the third clamping roller pair 40a, 40b. The telescopic support 44 automatically follows the angle to which the lower guide head 4 is pivoted. Therefore, it is mounted in a low friction manner in the joint seats 43a, 43b. With the aid of a compression spring 45, the telescopic support 44 tends to elongate along its axis. Compression spring 45 acts between telescopic piston 46 and telescopic cylinder 47. The support 44 is dimensioned in such a way that the frictional forces on joint seats 43a, 43b remain at a minimum while avoiding a snapping of telescopic support 44 out of the seats under the action of the wire forces. The support 44 is configured in such a way that the third clamping roller pair 40a, 40b is as close as possible to the outlet side of guide head 4. Thus, the deflection paths are kept small and the deformation stresses acting on the wire remain very small.

Figure 4:
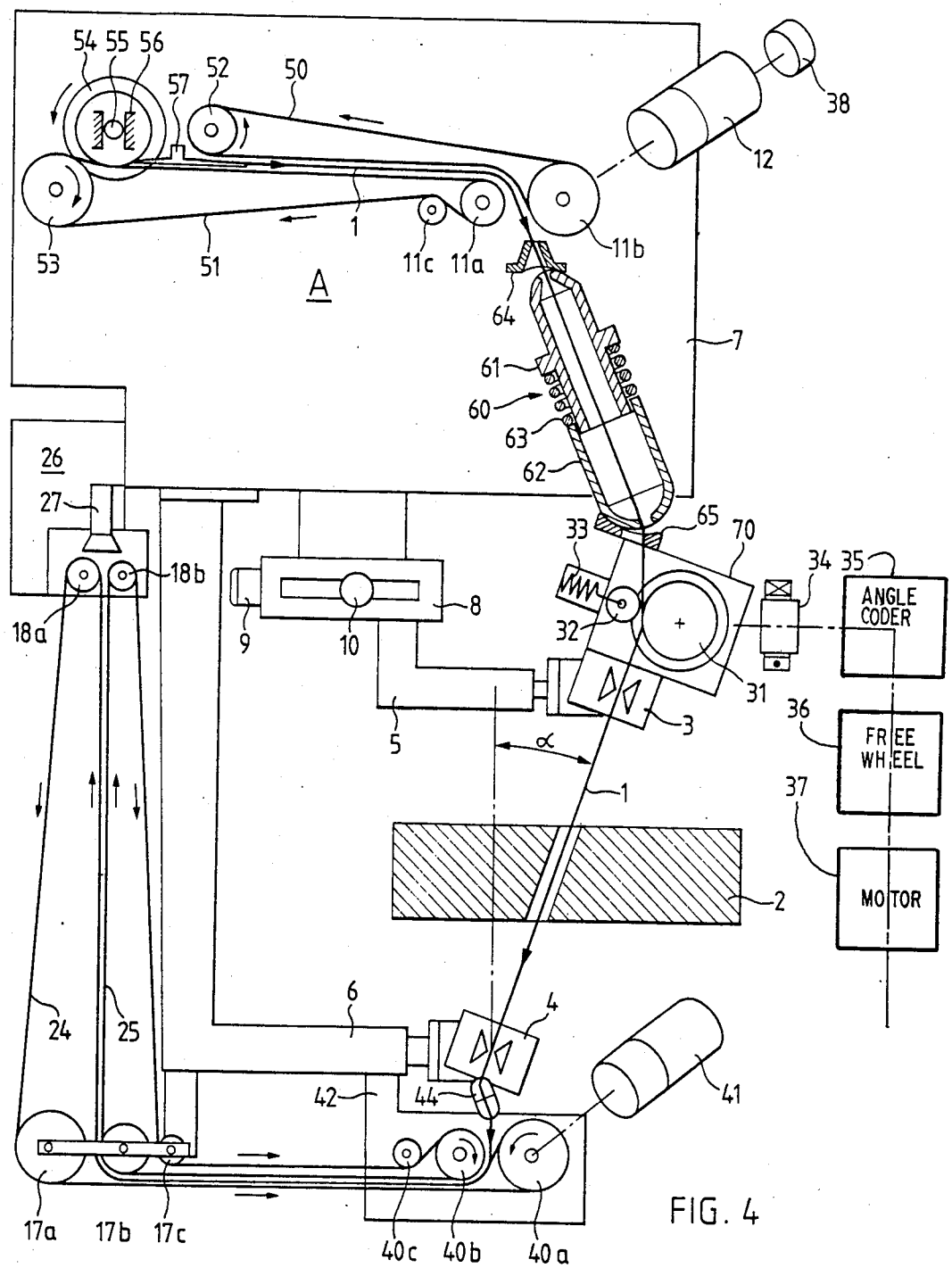
FIG. 4 an alternative embodiment for a wire drive, in accordance with the invention.

In FIG. 4, an embodiment of a wire drive according to the invention is shown using belt drive means for the wire supply and removal. The embodiment constitutes an alternative to the embodiment of FIG. 1, and corresponding parts carry the same reference numerals. By means of clamping roller pair 11a, 11b, geared motor 12 drives a double belt drive with conveyor belts 50, 51, around guide pulleys 52, 11c and 53. The wire electrode 1 is stored on a new wire reel 54. On the supply side A, the wire electrode 1 is supplied by conveyor belts 50, 51 to the clamping roller pair 11a, 11b, where electrode 1 is unwound from the new wire reel 54. Reel 54 with spindle 55 is held in a spindle guide 56. The removed wire is brought by a wire guide 57 to a central supply zone of conveyor belts 50, 51. In order to avoid excessively large wire angles between the unwinding point of the wire at the end positions of the wire reel 54 and the wire guide 57, a sufficiently large distance is left between them. Preferably the circumferential speed of the new wire reel 54 is adapted to the angular position of the tensioned wire. The speed of conveyor belts 50, 51, in operation, corresponds to the supply rate of the wire electrode 1 in the working zone. In the case of FIG. 4, this is made possible by the fact that the spindle 55 is vertically movable in spindle guide 56, so that the new wire reel 54 rests with its wire circumference, and therefore its weight, on belt 51. Thus, reel 54 is automatically unwound at a speed corresponding to the belt running speed, in accordance with the current diameter of the wire winding layer. If it is desired to use wire reels having a relatively large weight, the bearing weight of the reel can be additionally limited by supporting the spindle 55 of the new wire reel 54 on compensating springs.

The wire drive behind the clamping roller pair 11a, 11b can be constructed in the same way as in the embodiment of FIG. 1.

According to the embodiment of FIG. 4, a telescopic support 60 is provided on the wire supply side and is supported between the joint seat 64, near the clamping roller pair 11a, 11b, and the joint seat 65, which replaces the wire guide ring 30 (FIG. 1). Once again the telescopic support 60 comprises a telescopic piston 61 and a telescopic cylinder 62, which are supported against one another by means of compression spring 63 so that the length of telescopic support 60 can be adapted to the spacing between the joint seats 64, 65. On the take-up side, belts 24, 25 are driven by clamping rollers 40a, 40b, where roller 40a is shown driven by means of the geared motor 41. In accordance with this belt drive, additional guide pulleys 18a, 18b, 17a, 17b, 17c and 40c are introduced. The conveying of wire electrode 1 once again takes place in such a way that the two belts 24, 25 convey the electrode 1 secured between them, while the belts return on the outside. At the outlet of the belts at guide pulleys 18a, 18b, belts 24, 25 transfer wire electrode 1 to a collecting hopper 27, through which it is supplied to a removal means 26, which can be a container, a slicing means, or a winding reel for example.

Figure 5:
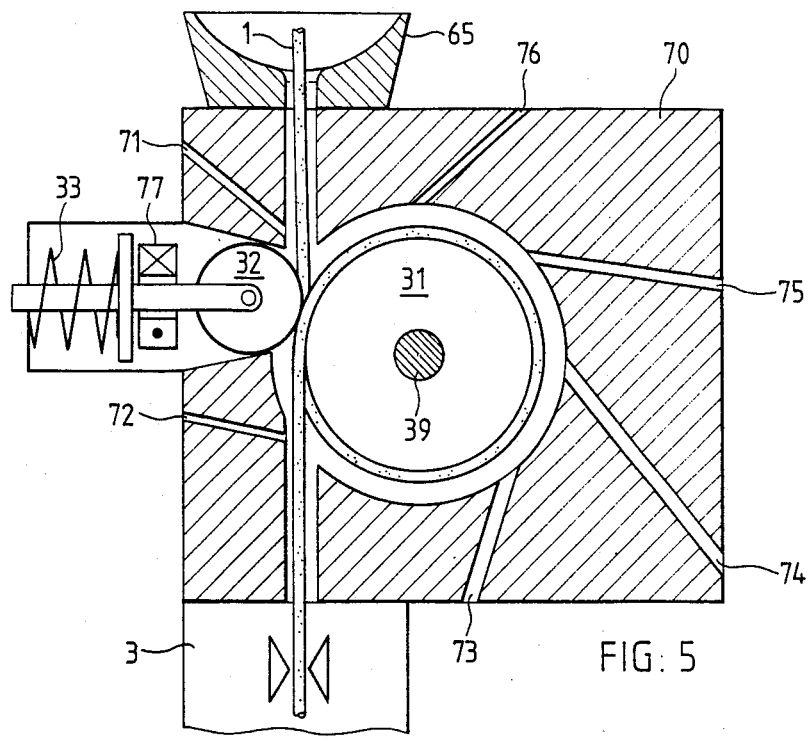
FIG. 5 a diagrammatic view of the wheel housing shown in FIG. 4.

If the supply side joint seat 64 positioned at clamping roller pair 11b, 11a is combined with a wire injection means as described in DE-OS No. 2351357 then the wire can be conveyed from the new wire reel 54 automatically through the entire working zone at the removal means 27. This assumes that the automatic looping of the V-grooved wheel 31 is made possible. A technical embodiment is described relative to FIG. 5. The joint seat 65 replacing the wire guide ring 30 is so fitted on housing 70 that the supplied wire electrode 1 issues into a channel passing tangentially to the groove of wheel 31, which is mounted on shaft 39. To ensure secure engagement of the wire electrode 1, the housing 70 has a plurality of tangential blowholes 71 to 76, which are supplied with a blast of air to aid the passing of electrode 1 around the grooved wheel 31. During threading, the latter is simultaneously driven at a corresponding speed by motor 37. Furthermore, for the duration of threading, clamping wheel 32 is raised by a magnet 77 in opposition to the force of sping 33 and is consequently disegaged from V-grooved wheel 31. The insertion of wire electrode 1 into the upper wire guide head 3 is then taken over by a further channel.

Figure 6:
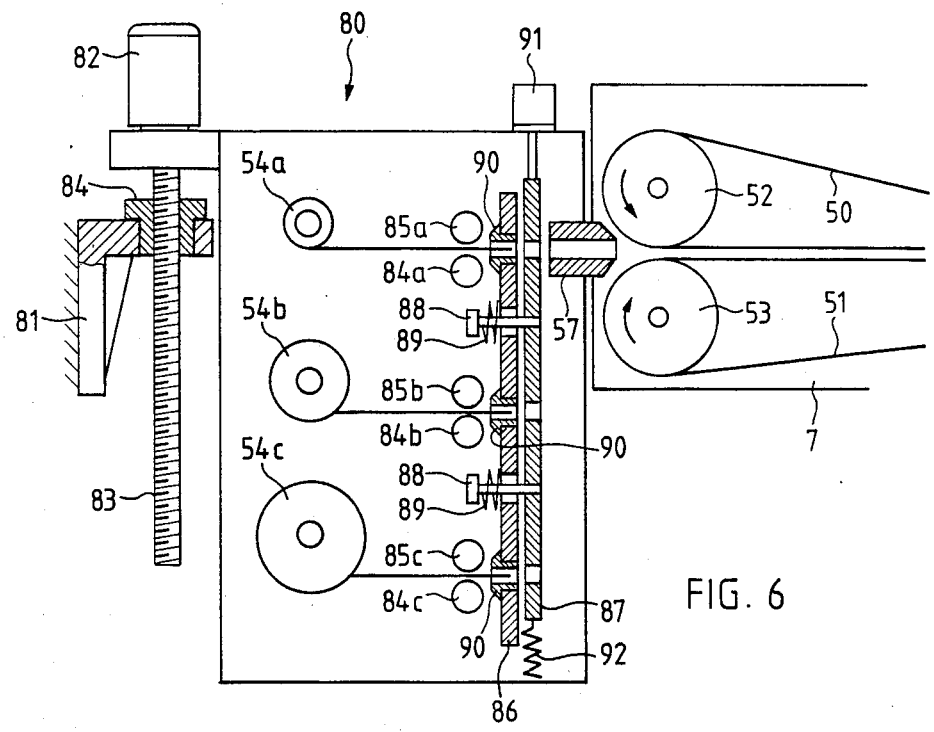
FIG. 6 a diagram of a wire changing device that may be used in conjunction with the present invention.

According to FIG. 4, when using the housing 70 it is merely a question of regulating the low wire tensile stress on the supply side up to the V-grooved wheel 31. For this purpose a further encoder 38 is mounted on the axle of the geared motor 12 and by comparison with angle coder 35 makes it possible to form a speed difference signal. With the aid of this speed difference between the clamping roller pair 11a and 11b and the V-grooved wheel 31, it is possible to set within the elastic range of the wires a differential speed corresponding to the necessary tension. With the use of the means shown in FIG. 5, it is additionally possible to provide an automatic wire change device 80, shown in FIG. 6, for the wire drive.

In this case there is no wire reel bearing, the guide pulleys 52, 53 are arranged in parallel on machine frame 7, and a modified wire guide 57a is provided. The wire change device can be fixed by means of its flange 81 to a separate frame, or to the spark-erosive cutting installation. The casing of the wire change device 80 can be set to different levels under control of a motor 82 and by means of a spindle 83 which cooperates with a nut 83a. According to FIG. 6, there are three new wire reels 54a, 54b, 54c, which can carry the same or different quantities and size of wire. On placing said reels in the casing, in each case the free wire end of the loaded reel 54 is threaded into an associated clamping roller pair 84a, 85a; 84b, 85b; 84c, 85c. Corresponding to the position set by motor 82 in front of wire guide 57a, only the clamping roller pair 84, 85 located there is driven. Under the influence of a slip brake, the particular new wire reel 54 is rotated at the same time, so that in the feed zone between the new wire reel and the clamping roller pair 84, 85, a controlled slight wire tension is maintained. At the outlet side of the clamping roller pairs 84, 85 is provided a shearing blade pair 86, 87, which are tensioned flat on one another by means of cams 88 and springs 89. At the insertion zone of the wires from the clamping roller pairs 84, 85 are provided hardened bushes 90, which act as shearing stops with respect to shearing blade 87. The latter is actuated by a magnet 91 in the cutting direction, while the return is brought about by spring 92. When it is desired to change the reel in a work program, is it necessary to cut through a wire end using the shearing blade pair 86, 87, and then the wire drive system conveys the wire residue to the removal means 26. After adjusting the wire changer device by means of the motor 82 to the next type of wire which is required, then with the aid of the clamping roller pairs 84, 85 the wire is advanced in wire guide 57a toward the belt drive until the wire is taken-up by the belt drive. At this time the motor drive is disengaged with respect to the clamping oller pair 84, 85.

Apart from achieving high precision for spark-erosive conical cutting with oriented guide heads, the described wire drive also makes it possible to combine automatic threading of wire electrode 1 and an injection nozzle. The injection nozzle threading jet can be oriented together with the oriented guide heads 3, 4 to the instantaneous position of the wire zone, and the wire is automatically taken-up on the outlet side by the clamping roller pair 40a, 40b, even when using the simple embodiment shown in FIG. 4. The jet need only be used for aligning the wire electrode 1 while its advance takes place with the aid of motor 27 through freewheel 36 and V-grooved wheel 31, on which the electrode 1 is maintained by clamping roller 32. In the case of varying widths between guide heads 3, 4, the angle coder 35 is used for measuring the necessary advance zone.

By comparing the wire removal rate at clamping roller pair 40a, 40b and the feed rate at the grooved wheel 31 as determined with the angle decoder 35, it is possible to obtain a speed difference signal which provides information on the uniformity of the wire tensile stress in the working zone and can be used for detecting wire breaks. Such a speed difference may result from thermal overloading of the wire electrode 1 in the working zone and through excessive tension if wire with an inadequate machanical strength is passed through the zone. The resolution of the speed measurement can take place by electronic means (not shown), so that a relief signal for the wire tension on the hysteresis motor 34 or a power cut-back signal on the eroding generator is provided before the wire breaks, so that wire breakage is prevented. When detecting the wire speed, it is unimportant whether wire expansion or extension takes place thermally or in the elastic range of the tension/expansion curve of the wire material or in the plastic deformation zone of the wire material.

What is claimed is:

1. An apparatus for guiding a wire or strip-like electrode on a spark erosion machine tool having a first and second electrode guide means for setting the position of the cutting electrode in a working zone located between the two guide means, comprising:

drive means located in close proximity to one of the guide means for axially drawing the cutting electrode through the working zone, said drive means axially drawing said electrode through said working zone at a predetermined speed, and counter-holder means located in close proximity to the other guide means for exerting a selectable force on the cutting electrode to control the axial tension on that portion of the cutting electrode between the guide means in the working zone, the cutting electrode not being subject to substantial tensile forces in the remainder of the guiding apparatus.

2. An apparatus according to claim 1 further including means for selectively introducing one of a plurality of cutting electrodes into the electrode guide means.

3. An apparatus according to claim 1 wherein the drive means comprises a pair of selectively driveable clamping rollers located on a outlet side of the associated guide means to receive the cutting electrode as it exits the associated guide means to axially draw the cutting electrode through the working zone.

4. An apparatus according to claim 1 wherein the electrode guide means associated with the drive means is adapted to be controllably oriented along the direction of the cutting electrode and the drive means is fixed with respect to the machine tool, the apparatus further comprising a telescopic support means positioned between the drive means and its associated guide means for guiding the cutting electrode from the associated guide means to the drive means under various orientations of the associated guide means.

5. An apparatus according to claim 1 further comprising a means for measuring the speed of the cutting electrode in the proximity of the guide means associated with the counter holder means; a means for measuring the speed of the cutting electrode in the proximity of a second drive means for supplying the cutting electrode to the counter-holder means; and a means connected to the two measuring means for evaluating the difference of the two measured speeds.

6. An apparatus according to claim 5 further including a means for regulating the speed of the second drive means in accordance with the evaluated speed difference.

7. An apparatus for guiding a wire or strip-like electrode on a spark erosion machine tool having a first and second electrode guide means for setting the position of the cutting electrode in a working zone located between the two guide means, comprising:

drive means located in close proximity to one of the guide means for axially drawing the cutting electrode through the working zone, said drive means axially drawing said electrode through said working zone at a predetermined speed, and counter-holder means located in close proximity to the other guide means for exerting a selectable force on the cutting electrode to control the axial tension on that portion of the cutting electrode between the guide means in the working zone, the cutting electrode not being subject to substantial tensile forces in the remainder of the guiding apparatus; wherein the drive means comprises a motor drive for drawing the cutting electrode through the working zone at a selected speed and the counter-holder means comprises a grooved wheel having a torque action, over which wheel the cutting electrode is wound at least once, said torque being selected to provide a desired retarding force on said cutting electrode.

8. An apparatus according to claim 7 further including means for pressing the cutting electrode to the grooved wheel in transport engagement.

9. An apparatus according to claim 7 wherein the grooved wheel has associated with it means for automatically winding the cutting electrode around the grooved wheel.

10. An apparatus according to claim 9 wherein the automatic winding means comprises a housing for the grooved wheel including a plurality of means spaced around the periphery of the grooved wheel for directing pressurized medium along tangents to the periphery of the wheel in the plane of the wheel.

11. An apparatus for guiding a wire or strip-like electrode on a spark erosion machine tool having a first and second electrode guide means for setting the position of the cutting electrode in a working zone located between the two guide means, comprising:

drive means located in close proximity to one of the guide means for axially drawing the cutting electrode through the working zone, said drive means axially drawing said electrode through said working zone at a predetermined speed, and counter-holder means located in close proximity to the other guide means for exerting a selectable force on the cutting electrode to control the axial tension on that portion of the cutting electrode between the guide means in the working zone, the cutting electrode not being subject to substantial tensile forces in the remainder of the guiding apparatus; wherein the electrode guide means associated with the counter-holder means is adapted to be controllably oriented along the direction of the cutting electrode and the counter-holder is fixed with respect to the machine tool, the apparatus further comprising a telescopic support means positioned between the counter-holder means and its associated guide means for guiding the cutting electrode from the counter-holder means to the associated guide means under various orientations of the associated guide means.

* * * * *